United States Patent
Galehouse et al.

(10) Patent No.: US 8,240,923 B2
(45) Date of Patent: Aug. 14, 2012

(54) X-RAY TUBE ROTATING ANODE ASSEMBLY BEARING

(75) Inventors: Martin Scott Galehouse, Muskegon, MI (US); Ryan D. Evans, North Canton, OH (US); Gary L. Doll, Canton, OH (US); Joseph P. Greathouse, Nelson, NH (US)

(73) Assignee: The Timken Company, Canton, OH (US)

( * ) Notice: Subject to any disclaimer, the term of this patent is extended or adjusted under 35 U.S.C. 154(b) by 850 days.

(21) Appl. No.: 12/332,172

(22) Filed: Dec. 10, 2008

(65) Prior Publication Data

US 2009/0180725 A1 Jul. 16, 2009

Related U.S. Application Data

(60) Provisional application No. 61/021,081, filed on Jan. 15, 2008.

(51) Int. Cl.
*F16C 33/00* (2006.01)
*F16C 33/60* (2006.01)
*H01J 35/00* (2006.01)

(52) U.S. Cl. .......................... 384/625; 384/499; 378/132

(58) Field of Classification Search .......... 148/228–238, 148/589, 316–319; 427/249.17–249.19, 427/255.394, 419.7, 367, 528, 530, 564, 427/566, 569, 577, 597; 378/121, 125, 127, 378/128, 132; 384/492, 499, 500, 504, 493, 384/517, 518, 569
See application file for complete search history.

(56) References Cited

U.S. PATENT DOCUMENTS

| | | | |
|---|---|---|---|
| 3,956,653 A * | 5/1976 | Lauwasser | 378/128 |
| 4,097,759 A * | 6/1978 | Furbee et al. | 378/128 |
| 4,914,684 A | 4/1990 | Upadhya | |
| 4,956,858 A | 9/1990 | Upadhya | |
| 4,988,534 A | 1/1991 | Upadhya | |
| 2003/0091148 A1* | 5/2003 | Bittner et al. | 378/128 |
| 2004/0038084 A1* | 2/2004 | Aharonov et al. | 428/698 |
| 2005/0047949 A1* | 3/2005 | Becquerelle et al. | 419/8 |
| 2008/0095316 A1* | 4/2008 | Qiu et al. | 378/132 |

FOREIGN PATENT DOCUMENTS

JP 56042944 A * 4/1981
JP 2000208078 A * 7/2000

OTHER PUBLICATIONS

E Rabinowicz; The Determination of the Compatibility of Metals through Static Friction Tests; ASLE Transactions, 14 [3] (1971) pp. 198-205.

* cited by examiner

*Primary Examiner* — Richard W Ridley
*Assistant Examiner* — Phillip A Johnson
(74) *Attorney, Agent, or Firm* — Polster, Lieder, Woodruff & Lucchesi, L.C.

(57) ABSTRACT

A thermally stable tribological coating is applied to the outer surface of a moveable bearing outer ring in a bearing assembly for an x-ray tube rotating anode and/or the surface of a housing bore of the X-ray tube rotating anode which receives the bearing assembly. If the tribological coating is applied to the outer surface of the bearing outer ring, it is made of a material that is metallurgically incompatible with the material from which the housing containing the bearing is made. The coating includes one or more of the following: Cr, W, Mo, or Nb, or nitrides, carbides, oxides, or sulfides of Cr, W, Mo, or Nb.

11 Claims, 3 Drawing Sheets

X-RAY TUBE ROTATING ANODE ASSEMBLY BEARING

CROSS-REFERENCE TO RELATED APPLICATIONS

This application claims priority to U.S. Provisional App. No. 61/021,081 filed Jan. 15, 2008 and which is incorporated herein by reference.

STATEMENT REGARDING FEDERALLY SPONSORED RESEARCH OR DEVELOPMENT

Not Applicable.

BACKGROUND OF THE INVENTION

This application relates to bearing assemblies which operate in high heat environments, and in particular, to a coating for a bearing assembly which is incorporated in a rotating anode assembly of an x-ray tube.

An x-ray tube for the production of x-ray radiation used in medical and industrial applications includes an anode and cathode within a vacuum envelope. X-ray radiation is produced when an electron beam is accelerated between the cathode and anode surface by means of high voltage. The impingement of the high energy electron beam upon the surface of a circular anode target disk produces x-ray radiation and excess heat. Typical x-ray tubes for medical applications are less than 1% efficient in converting electrical energy into x-ray radiation and can reach bulk temperatures of 1200° C.-1400° C. within the target disk.

In order to distribute the excess heat created during the generation of x-ray radiation, a rotating anode assembly has been adopted for many applications. The anode assembly is rotated about an axis such that the electron beam impinges on the outer edge, or track, of the circular target disk. This rotation ensures that each section of the rotating track is only heated by the electron beam for a short amount of time before rotating out of position to cool before rotating back to be heated again. With reference to FIG. 1A, a typical x-ray tube XTR with a rotating anode includes an anode A and cathode C. The anode A includes a target T mounted on a rotor R. A bearing and housing assembly BH is contained within the rotor R and is mounted via the bearing hub H.

The bearing and housing assembly BH of FIG. 1A is shown in greater detail in FIG. 1B. In order to provide rotation, the target disk, which is typically mounted on a rotor and driven by an induction motor, is supported by a bearing assembly 1 mounted in a bearing housing 2 which provides for smooth rotation about the axis. The rotor is mounted to a bearing hub 4. The bearing assembly typically includes at least two sets of rotating elements (e.g., balls) and is lubricated using a solid lubricant such as a soft metal to provide minimal frictional resistance. Efforts are made to protect the bearing from the intense heat of the target disk in order to prolong bearing life. However, bearing temperatures can still reach up to 450° C. in many applications. In order to withstand the high temperatures experienced in the application, the bearings and rolling elements are typically fabricated from high speed tool steels such as M62, M4, M42, T5, T15, and REX-20.

To aid in the cooling of the bearing, many applications utilize bearing housings 2 fabricated from oxygen free high conductivity (OFHC) copper and/or other copper-containing alloys. This copper bearing housing is connected through a vacuum envelope and acts as a heat sink drawing heat energy away from the bearing assembly.

In most applications, the two spaced apart sets of rolling elements are separated on the bearing shaft 3 in order to provide bearing rigidity and achieve smooth rotation. The rotator shaft may also serve as the inner raceway for the rolling elements of the bearings as shown in FIG. 1b. During operation, heat is transferred into the bearing from the bearing shaft 3 through the bearing hub 4 which is machined into, or welded to the shaft 3. The large amount of bearing heating through the shaft 3 causes the shaft to lengthen due to thermal expansion. In order to compensate for this shaft expansion, the outer rings 5 of the bearings must slide within the bore of the bearing housing 2. Failure of the outer rings to slide within the housing to compensate for the thermal expansion will cause the bearing to perform improperly (e.g., due to misalignment, incorrect preload level, etc.) resulting in premature bearing failure and a lessened service life time. Bearing failure is typically accompanied by high noise and vibration, as well as increased operating torque or reduced rotational speed. In extreme failure cases, bearing seizure and stopped anode rotation may occur, which may cause overheating of the target track and damage the anode assembly.

Due to the extreme cleanliness of the bearing components and bearing housing, along with the high temperature and high vacuum environment, it is common for bearing outer rings that are made from high speed tool steel and the bearing housing made from OFHC copper or other copper alloys to gall under the relative sliding motion and/or initiate diffusion bonding or other solid-to-solid adhesion damage. A photograph showing transfer of Cu-containing material from a bearing housing to the outer surface of an outer bearing ring after operation in an x-ray tube rotating anode assembly is shown in FIG. 2. FIG. 2 is a photograph of a prior art outer bearing ring that was installed and operated in an X-ray tube rotating anode housing. After removal from the housing, transferred material from the Cu-containing metallic housing is visible on the outer bearing ring. This illustrates the extent to which adhesive interactions between the outer bearing ring and housing occurred, which prevented relative motion between the bearing ring and the housing and therefore prevented compensation for thermal expansion in the housing. From FIG. 2, it is clear that copper-containing material from the housing adheres to the surface of the tool steel outer bearing ring so tenaciously that it is torn out when the ring is removed from the housing. Strong adhesive bonds such as these prevent relative motion between the outer bearing rings and the housing during operation such that thermal expansion cannot be compensated for and the bearing is misaligned or improperly loaded and fails prematurely. When this adhesive interaction or bonding occurs, the performance of the bearing, and as a result the X-ray tube, is severely compromised as described. A method of preventing the bonding of the bearing components to the bearing housing would be a significant improvement over the existing technology.

We are not aware of any current solutions to this problem for copper-containing metal alloy housings. The bore surfaces of stainless steel housings and steel housings have been coated with silver (Ag) to maintain relative motion between the outer bearing rings and the housing. We do not believe a silver coating solution will work for the copper housings because there is a degree of metallurgical solubility between copper and silver at high temperatures, and this may encourage diffusion or adhesive bonding between Cu, Ag, and a steel bearing outer ring. Furthermore, silver is a component in common filler metals for use in brazing copper—so silver is presumably not a preferred material for preventing bonding of Cu alloys.

BRIEF SUMMARY OF THE INVENTION

A bearing assembly for a rotating anode of an x-ray machine comprises a housing having a bore, a bearing outer ring which is received in the bore, and a shaft which is received within the bearing outer ring. The bearing outer ring defines an outer raceway on its inner surface (i.e., ID surface). A bearing shaft is received in the housing bore and can define an inner raceway. Alternatively, a separate inner ring can be provided which defines the inner raceway on its outer surface (i.e., on its OD surface). Rolling elements (usually balls) separate the inner and outer raceways and can roll between the raceways as the shaft and housing are rotated relative to each other.

The housing is made from copper (or a copper containing alloy) and the bearing outer ring is made from steel (or an iron containing alloy). The bearing outer ring is movable, at least in part, relative to the housing. In accordance with one aspect of the claimed invention, the outer surface of at least the portion of the outer ring which is movable relative to the housing is coated with a tribological coating comprised of a material which is metallurgically incompatible with the housing material to prevent the bearing outer ring from binding to an inner surface of the housing bore such that the bearing outer ring portion will remain slidable relative to the bore. Preferably, substantially the entire outer surface of the bearing ring outer portion is coated with the coating. The coating is chosen from the group consisting of Cr, W, Mo, Nb, or nitrides, carbides, oxides, or sulfides of Cr, W, Mo, or Nb, and combinations thereof. That is, the coating can comprise Cr, W, Mo, Nb, Cr nitride, W nitride, Mo nitride, Nb nitride, Cr carbide, W carbide, Mo carbide, Nb carbide, Cr oxide, W oxide, Mo oxide, Nb oxide, Cr sulfide, W sulfide, Mo sulfide, Nb sulfide, and combinations thereof. The coating has a thickness that is preferably less than 10 μm.

As an alternative, the coating can be applied to the surface of the bore. Coating of the bore surface can either be in addition to, or in lieu of, coating of the outer surface of the bearing outer ring. If the coating is applied to the bore surface, then the coating will need to be metallurgically incompatible with the material from which the bearing outer ring is made. If coatings are applied to both the bore surface and the outer surface of the bearing outer ring, the coatings will need to be made from materials which will resist adhesion.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1A:
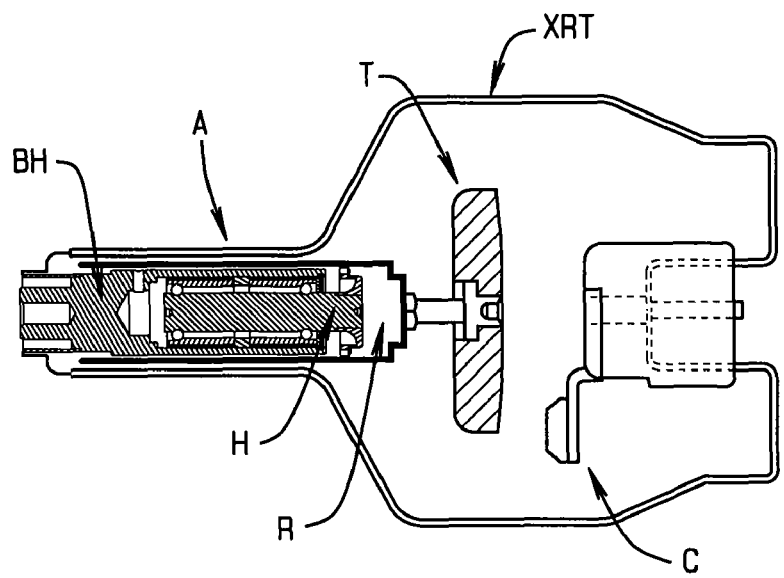
FIG. 1A is a schematic drawing of a typical x-ray tube containing a rotating anode.
Figure 1B:
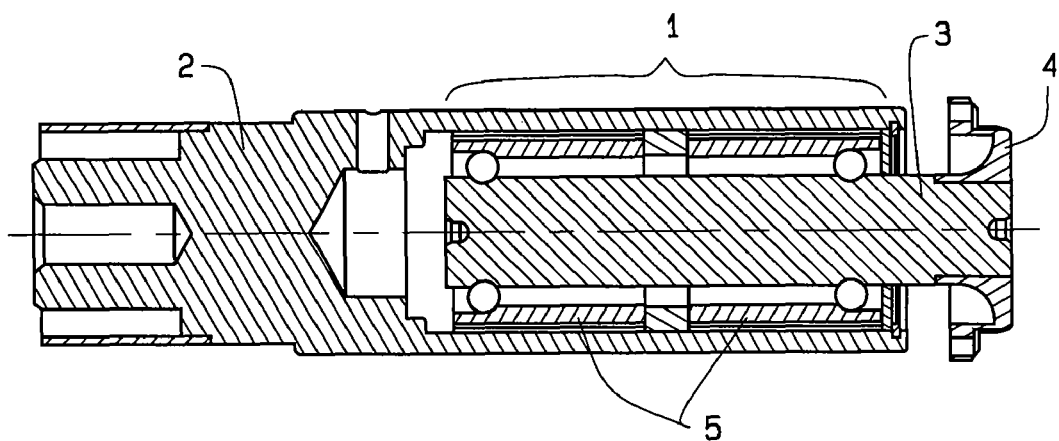
FIG. 1B is an enlarged schematic drawing of a prior art bearing housing and assembly in an x-ray tube rotating anode assembly.

The following detailed description illustrates the invention by way of example and not by way of limitation. This description will clearly enable one skilled in the art to make and use the claimed invention, and describes several embodiments, adaptations, variations, alternatives and uses of the invention, including what we presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 3:
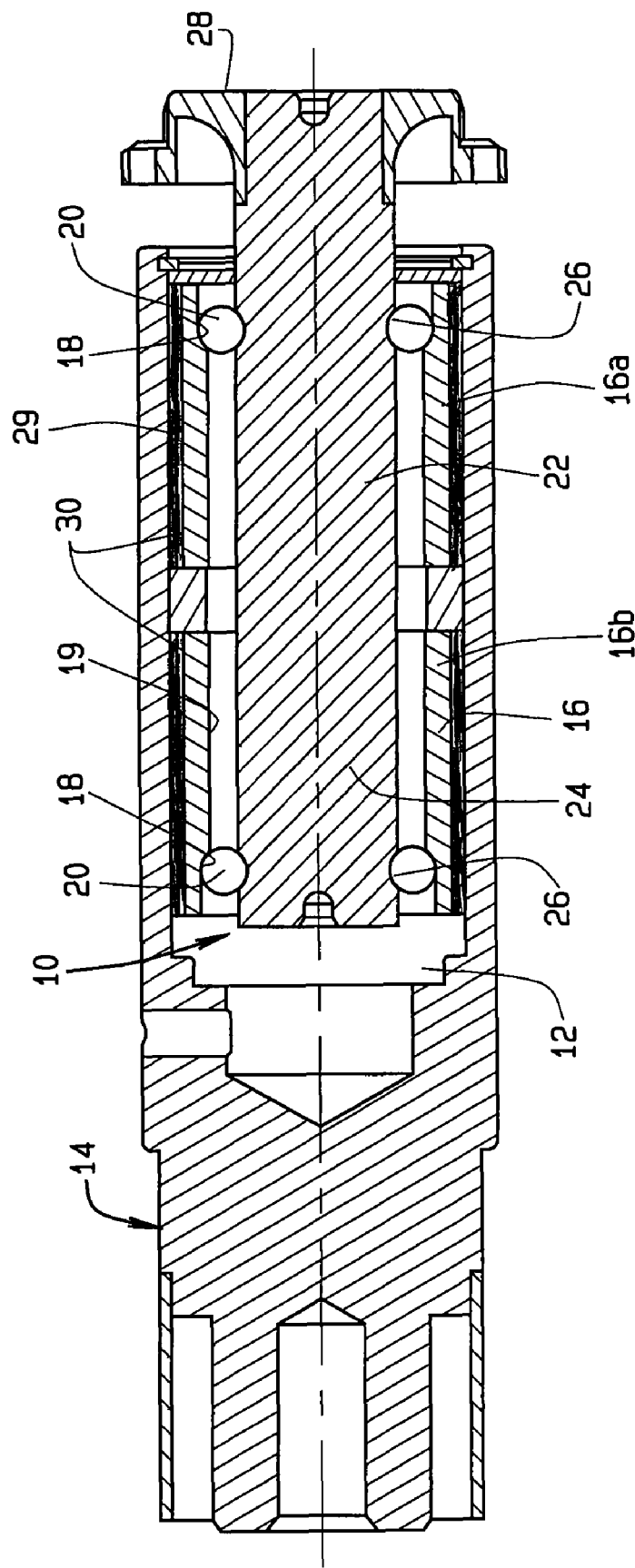
FIG. 3 is a schematic drawing of x-ray tube rotating anode assembly bearing made in accordance with the claims.

An illustrative bearing assembly 10 (FIG. 3) for an x-ray tube anode is received in the bore 12 of a housing 14. The housing 14 is made from copper or a Cu-containing metallic alloy. This housing 14 is designed to be received in the x-ray tube assembly, such as the X-ray tube assembly XRT shown in FIG. 1a. The bearing assembly 10 comprises an outer bearing ring 16 which is received within the housing bore 12. The bearing ring 16 is made from an iron containing alloy, such as steel. The alloy from which the bearing outer ring is made can be a tool steel. The bearing ring 16 has an outer diameter that is only slightly less than the inner diameter of the bore, so that the bearing ring 16 will remain axially centered relative to, and coaxial with, the bore 12 during operation. Outer raceways 18 are formed on an inner surface 19 of the bearing ring 16. As seen in FIG. 3, the outer raceways 18 are defined by a curved or arced portion of a reduced thickness area at the ends of the bearing ring 16. A sloping surface leads away from the curved portion.

A rotating bearing shaft 22 is received in the housing bore 12. The shaft 22 includes inner raceways 26 positioned to be aligned with the outer raceways 18. As seen in the embodiment of FIG. 3, the inner raceways 26 are defined by curved or arced grooves in the bearing shaft 22. If desired, bearing inner rings could be provided which have a raceway groove formed in an outer surface to define the inner raceway. In such an instance, the shaft 22 could be received in the bore of the inner bearing ring. A bearing hub or anode 28 is mounted to the end of the shaft 22.

Two spaced apart rows of rolling elements 20 are positioned between the inner and outer raceways to facilitate rotation motion of the shaft 22 and the housing 14 relative to each other. In the illustrative embodiment shown in FIG. 3, the rolling elements 20 are balls. The curvature of the balls corresponds to the curvature of the inner raceway and the outer raceway. Hence, the curvature of the inner and outer raceways defines a segment or arc of a circle. The bearing is preferably a full complement bearing (and hence, no cage is used). However, a cage could be used if desired. The spaced apart rows of rolling elements provide bearing rigidity and achieve smooth rotation.

The housing bore 12 is longer than the bearing outer ring 16 to allow the bearing outer ring to slide axially in the bore relative to the housing 14. During operation, heat is transferred into the bearing assembly 10 from the rotor through the bearing hub 28 which is machined into, or welded to the bearing shaft 22. The large amount of bearing heating through the rotating shaft 22 causes the shaft 22 to lengthen due to thermal expansion. In order to compensate for this shaft expansion, the outer rings 16 of the bearings must slide within the bore of the bearing housing 12.

Figure 2:
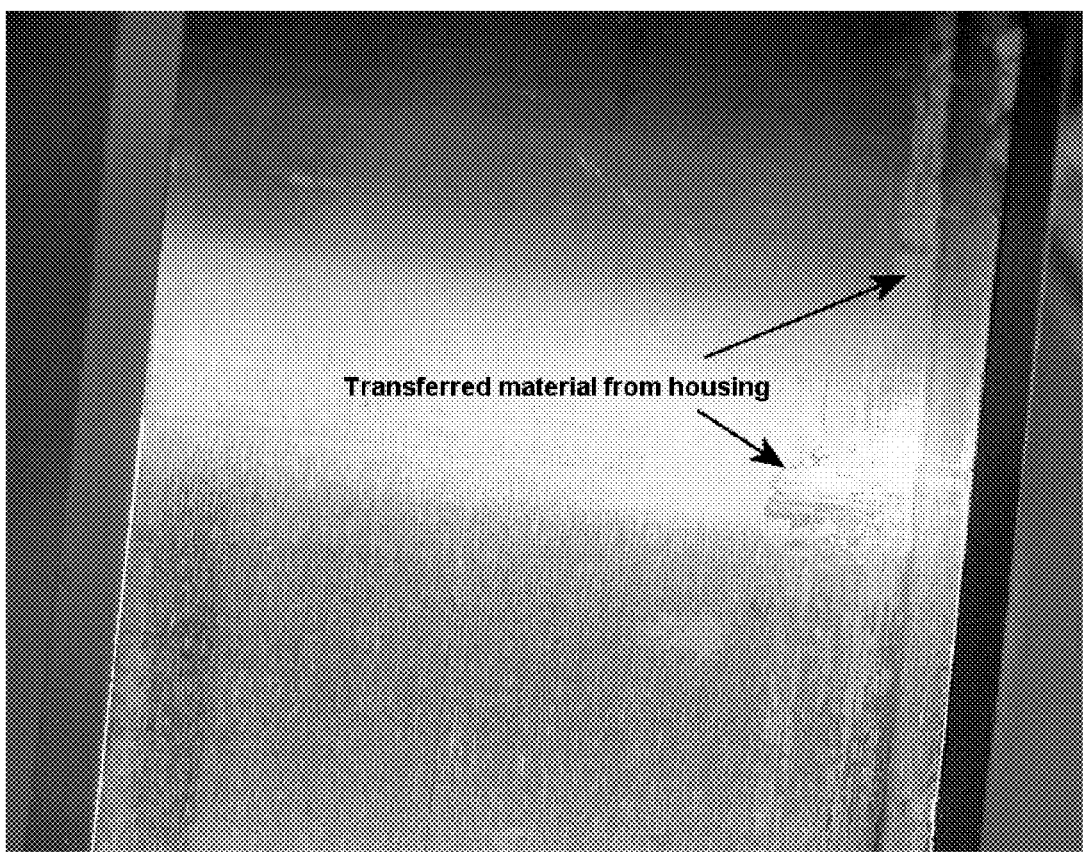
FIG. 2 is a photograph of a prior art outer bearing ring that had been installed and operated in an x-ray tube rotating anode housing to illustrate the extent to which adhesive interactions between the outer bearing ring and housing occur in currently available assemblies.

To enable the bearing outer ring 16 to slide within the housing bore 12 the outer diameter surface 29 of the outer bearing rings 16 of an x-ray tube rotating anode assembly 10 was coated with a thin, wear resistant coating 30. It will be apparent that the coating 30 is shown in a greatly enlarged scale in the drawings for purposes of illustration. The coating 30 substantially prevents adhesive interactions such as welding, diffusion bonding, or galling between the outer bearing ring surface and the Cu-containing metallic alloy housing (such as shown in FIG. 2). By preventing adhesive interactions, the outer bearing rings 16 are free to slide within the housing bore 12 to accommodate thermal expansion during operation and maintain proper alignment and loading conditions. The outer bearing ring 16 may also rotate relative to the housing bore 12. However, this is not a requirement and may not be desirable for certain assembly designs. Thus, in certain circumstances, the outer bearing ring may be rotationally locked to prevent rotation of the outer bearing ring 16 relative to the housing bore 12. If adhesive interactions between the copper-containing metallic alloy housing and the outer bearing ring occur, bearing misalignment may result, producing improper contact angles, for example, and leading to premature failure. Preventing adhesive interactions between the outer bearing rings and the housing may also reduce the life variability of bearing assemblies in x-ray tube rotating anode assemblies.

The bearing outer ring 16 can comprise two (or more) portions. For example, with reference to FIG. 3, the bearing outer ring 16 can comprise an axial outer portion 16a and an axial inner portion 16b. In some applications, one portion (such as portion 16a) may be fixed relative to the housing bore 12 and other portions (such as portion 16b) may be axially movable relative to the housing bore 12. In this instance, the coating 30 need be applied only to the portion 16b which can move relative to the housing bore—the portion 16a which is fixed in place in the housing bore need not be coated. However, coating of all sections of the outer bearing ring (as is shown in FIG. 3) facilitates inventory stocking, in that coated and uncoated bearing outer rings need not be inventoried.

The coating 30 should have the following characteristics:

The coating 30 must have metallurgical incompatibility with the housing, meaning that the Cu-containing metallic housing 26 should not want to "stick" to the outer bearing ring coating 16 (or vice-versa) at x-ray tube operating conditions. This adhesive or "sticking" mechanism may be diffusion bonding, welding, or galling, for example.

The coating 30 must be hard and wear resistant. The coating must withstand the process of bearing ring/housing installation and sliding within the Cu-containing metallic housing during operation without being rubbed off or otherwise removed. For this to be true, the coating hardness will typically need to exceed that of the substrate (i.e., the outer surface 29 or the outer ring 16 and the housing 14 as measured by nanoindentation.

The coating 30 must be thermally stable at the application temperatures. The coating must not react with the housing, itself, the substrate (i.e., the outer surface of the outer bearing ring 16), or the environment or be otherwise degraded at the application temperatures, which are typically around 450° C., in such a way as to compromise criteria set forth above. The thermal expansion coefficient mismatch between the coating 30 and steel material from which the outer bearing ring 16 is made must not be so great that the coating cracks and/or delaminates at application temperatures.

The coating 30 must substantially completely cover the outer diameter surface 29 of the portion of the outer bearing ring 16 which is moveable relative to the housing. If any portion of the outer bearing ring surface 19 that is in contact with the Cu-containing metallic housing is not coated, that area is susceptible to adhesive interaction with the housing that may ultimately result in premature bearing failure. Typical defects in thin film coatings such as "pinholes" (sub-millimeter sized holes in the coating, inherent to physical vapor deposition processes) are acceptable, but any uncoated areas greater than about 1 mm in diameter are not desired. It is preferred that every outer bearing ring in the x-ray tube rotating anode bearing assembly be coated. However, as noted above, at least the outer bearing rings which can move relative to the housing need to be coated. The coating need not be applied to the raceways 18 or 26 to achieve the goal of enabling the bearing ring 16 to slide relative to the housing. However, the coating could be applied to the raceways, the inner surface of the ring 16 or the shaft 22 if desired.

The coating 30 preferably has a thickness of less than about 10 μm so that the outer bearing ring and housing dimensions and tolerances need not be adjusted to accommodate the coating. A thicker coating can be used, but, as noted, this may require adjustment of the dimensions and/or tolerances of the housing 12, shaft 22, or bearing ring 16. Use of a thin coating (i.e., having a thickness of less than about 10 μm) without component redesign may allow the coating to be used with already existing hardware.

We have found experimentally that a chromium nitride (CrN) coating deposited using reactive physical vapor deposition (i.e., reactive sputtering or plasma assisted physical vapor deposition) works well in this application and meets the above criteria. The coating was applied to the bearing ring outer surface by magnetron sputtering of Cr targets in an argon and nitrogen containing atmosphere to deposit the CrN coatings. Prior to depositing the CrN top layer, the tool steel substrates were etched with argon ions for cleaning, a thin Cr layer was sputtered onto the tool steel substrate to increase adhesion, and a layer with a gradient of nitrogen up to the final CrN desired composition was formed. The final CrN composition can be a stoichiometric CrN composition (e.g., 50:50 Cr:N) or a substoiciometric type chromium nitride (e.g., N dissolved in Cr phases mixed with $Cr_2N$). The hardness as measured by nanoindentation techniques of the CrN coating is about 15 GPa, which exceeds that of the tool steel substrate and the Cu-containing metallic housing. The CrN coating is thermally stable and the thermal expansion properties of the coating are compatible with a REX-20 tool steel substrate, up to at least 500° C. as measured in dilatometry experiments and X-ray diffraction structure measurements. The coating had a thickness of 1-2 μm. The X-ray tube rotating anode bearing assembly life was dramatically increased by applying CrN coating to the outer diameter surfaces of outer bearing rings. In testing, a rotating anode assembly incorporating a coated outer ring, as described above, surpassed the typical bearing life goal of 1000 hours. In fact, the assembly ran for more than 1500 hours—which is a 50% increase over the life of currently available bearings.

Rabinowicz [E. Rabinowicz, "The determination of the compatibility of metals through static friction tests," *ASLE Transactions* 14 [3] (1971) 198-205)] published a metallurgical compatibility study that related the equilibrium solubility characteristics of pure metal pairs to friction and wear performance. "Incompatible" pairs of metals have low static friction coefficients, indicating a low tendency for adhesive interactions. His table of results indicates that Cu is metallurgically incompatible or partially incompatible with Cr, W, Mo, and Nb. Our successful experience with CrN suggests that nitrides, carbides, oxides, and sulfides of these four elements may be likewise metallurgically incompatible with Cu-containing metallic housings for the x-ray tube rotating anode application. Therefore coatings comprised of oxides, nitrides, carbides, and sulfides of chromium (Cr), tungsten (W), molybdenum (Mo), niobium (Nb) and combinations thereof that meet the five criteria should be acceptable. Additionally, the pure metallic elements Cr, W, Mo, Nb or combinations thereof should also be acceptable (again, as long as they satisfy the five criteria of metallurgical incompatibility with Cu-containing metallic housings, hardness and wear resistance, thermal stability, complete coverage of the outer surface of the outer bearing ring(s), and low thickness).

As various changes could be made in the above constructions without departing from the scope of the invention, it is intended that all matter contained in the above description or shown in the accompanying drawings shall be interpreted as illustrative and not in a limiting sense. For example, although coating is described as being applied to the outer surface of the outer ring, the coating could be applied to the surface of the bore 12 either in lieu of coating the outer surface of the outer ring or in addition to coating the outer surface of the outer ring. If the coating is applied to the surface of the bore, the coating need not be applied to the entire bore surface. Rather, all that would be required is that the coating substantially cover the portion of the bore surface relative to which the movable bearing outer ring will slide. If the coating is applied to the surface of the bore instead of the outer surface of the bearing outer ring, the coating will need to be incompatible with the material from which the bearing outer ring is made to prevent adhesive bonding between the bearing outer ring and the housing bore. If both the outer surface of the bearing outer ring and the bore surface are coated, the coatings will need to be made from a material which will resist adhesion to prevent the bearing outer ring from binding or bonding to the housing. If both the outer surface of the bearing outer ring and the bore surface are coated, the coatings could be the same, or they could be different coatings. These examples is merely illustrative.

The invention claimed is:

1. A bearing assembly for an x-ray tube rotating anode, the bearing assembly comprising:
    a housing having an axial bore at one end thereof defining a bore surface;
    the housing being made from a material selected from a set of materials including copper or a copper-containing metallic alloy;
    an axially moveable bearing outer ring being made of iron or an iron containing alloy;
    said axially moveable bearing outer ring being sized to be received in said axial bore to be axially moveable relative to said axial bore;
    said axially moveable bearing outer ring having an inner surface and an outer surface;
    said axially moveable bearing outer ring inner surface defining an outer raceway;
    a shaft received inside of said axially moveable bearing outer ring;
    a plurality of rolling elements positioned between said outer raceway of the axially moveable bearing outer ring and said shaft;
    a thermally stable, tribological coating covering substantially all of said axially moveable bearing outer ring outer surface and/or substantially all of a portion of the bore surface relative to which the axially movable bearing outer ring will slide;
    said tribological coating selected to be metallurgically incompatible with the material of the housing to prevent said axially moveable bearing outer ring from binding to said bore surface such that said axially moveable bearing outer ring will remain axially movable relative to said axial bore; and
    wherein the tribological coating is a chromium nitride coating which contains N and Cr in a sub-stoichiometric composition with N dissolved in Cr phases mixed with Cr2N.

2. The bearing assembly of claim 1 wherein the tribological coating has a hardness which is greater than the hardness of the outer surface of the outer bearing ring and of the inner surface of the housing bore.

3. The bearing assembly of claim 1 wherein the tribological coating has a thickness of less than 10 µm.

4. The bearing assembly of claim 1 further comprising a fixed outer bearing assembly which is positionally fixed relative to said axial bore of said housing;
    said fixed outer bearing assembly comprising a fixed bearing outer ring and a plurality of rolling elements;
    said fixed bearing outer ring having an inner surface and an outer surface; and
    said fixed bearing outer ring inner surface defining a second outer raceway.

5. The bearing assembly of claim 4 wherein said tribological coating additionally covers the outer surface of said fixed bearing outer ring.

6. A method for increasing the operating life of a bearing assembly used in a high heat environment to substantially prevent welding of bearing components; the method comprising:
    providing a housing having an axial bore at one end thereof;
    the housing being made from copper or a copper-containing metallic alloy and the axial bore having a bore surface;
    providing a bearing comprising a movable bearing outer ring and a plurality of rolling elements;
    the movable bearing outer ring being made of iron or an iron containing alloy;
    said movable bearing outer ring having an inner surface and an outer surface;
    said movable bearing outer ring inner surface defining an outer raceway;
    said rolling elements being positioned on said outer raceway;
    said moveable bearing outer ring being sized to be received in said housing axial bore to slide relative to said housing axial bore yet remain coaxially aligned with said housing axial bore;
    coating substantially all of said outer surface of said moveable bearing outer ring with a thermally stable tribological coating, wherein said coating is a chromium nitride coating which contains N and Cr in a sub-stoichiometric composition with N dissolved in Cr phases mixed with Cr2N;
    said coating comprising a material which is metallurgically incompatible with the housing to prevent said moveable bearing outer ring from binding to an inner surface of said housing axial bore such that said moveable bearing outer ring will remain slidable relative to said housing axial bore; and
    providing a shaft to be positioned within a circumference defined by said rolling elements.

7. The method of claim 6 wherein said coating has a thickness of less than 10 µm.

8. The method of claim 6 further comprising a step of providing a fixed outer bearing assembly comprising a fixed bearing outer ring and a plurality of rolling elements;
    said fixed outer bearing assembly being positionally fixed relative to said housing axial bore;

said fixed bearing outer ring having an inner surface and an outer surface; and said fixed bearing outer ring inner surface defining a second outer raceway.

9. The method of claim 8 further comprising a step of applying said coating to the outer surface of said fixed outer bearing assembly.

10. A method for increasing the operating life of a bearing assembly used in a high heat environment to substantially prevent welding of bearing components, the method comprising:

providing a housing having an axial bore at one end thereof, said axial bore having a bore surface;

the housing being made from a material selected from a set of materials including copper and a copper-containing metallic alloy;

providing a bearing comprising a movable bearing outer ring and a plurality of rolling elements;

the movable bearing outer ring being sized to be received in said axial bore of the housing and being made of iron or an iron containing alloy;

said movable bearing outer ring having an inner surface and an outer surface;

said movable bearing outer ring inner surface defining an outer raceway;

said rolling elements being positioned on said outer raceway;

said moveable bearing outer ring being sized to be received in said axial bore of the housing to slide relative to said axial bore of the housing yet remain coaxially aligned with said axial bore;

providing a shaft to be positioned within a circumference defined by said rolling elements;

coating substantially all of said outer surface of said moveable bearing outer ring and/or substantially all of a portion of the bore surface relative to which the movable bearing outer ring will slide with a thermally stable tribological coating;

said coating comprising a coating material which is metallurgically incompatible with a material of the other of said movable bearing outer ring outer surface and said bore surface so as to prevent said moveable bearing outer ring from binding to said bore surface of said axial bore such that said moveable bearing outer ring will remain slidable relative to said axial bore; and wherein said coating is a chromium nitride coating which contains N and Cr in a sub-stoichiometric composition with N dissolved in Cr phases mixed with Cr2N.

11. The method of claim 10, wherein said coating is applied to the outer surface of said movable bearing outer ring; and wherein said coating material is selected to comprise a material which is metallurgically incompatible with the housing material.

* * * * *